(12) United States Patent
Cutler et al.

(10) Patent No.: US 8,730,049 B2
(45) Date of Patent: May 20, 2014

(54) WATER SENSING ELECTRODE CIRCUIT

(75) Inventors: David M. Cutler, Redding, CT (US); Vincent Berluti, Jr., Southbury, CT (US); Thomas F. Healy, Redding, CT (US); Jeffrey William Londona, Ridgefield, CT (US); James Alphonse Marquis, Danbury, CT (US); Mark Henry Méndez, Wappingers Falls, NY (US)

(73) Assignee: Aquatic Safety Concepts LLC, Cumming, GA (US)

( * ) Notice: Subject to any disclaimer, the term of this patent is extended or adjusted under 35 U.S.C. 154(b) by 146 days.

(21) Appl. No.: 13/489,726

(22) Filed: Jun. 6, 2012

(65) Prior Publication Data
US 2012/0246801 A1     Oct. 4, 2012

Related U.S. Application Data

(60) Continuation-in-part of application No. 13/040,330, filed on Mar. 4, 2011, now abandoned, which is a division of application No. 12/570,233, filed on Sep. 30, 2009, now abandoned, which is a division of application No. 12/175,797, filed on Jul. 18, 2008, now Pat. No. 7,642,921.

(60) Provisional application No. 61/500,742, filed on Jun. 24, 2011, provisional application No. 60/951,243, filed on Jul. 23, 2007.

(51) Int. Cl.
*G08B 23/00* (2006.01)
*G01R 17/02* (2006.01)
*A42B 1/24* (2006.01)

(52) U.S. Cl.
USPC ....... 340/573.6; 340/573.1; 324/98; 2/209.13

(58) Field of Classification Search
USPC ........................................ 350/573.6
See application file for complete search history.

(56) References Cited

U.S. PATENT DOCUMENTS 3,810,146 A * 5/1974 Lieb ............................. 340/541
4,068,221 A   1/1978 McClintock
4,189,722 A * 2/1980 Lerner .......................... 367/93

(Continued)

FOREIGN PATENT DOCUMENTS

JP    62-75280    4/1987
JP    62-252219   4/1987

(Continued)

OTHER PUBLICATIONS

Analog Devices, Inc., Single 0.275% Comparator and Reference with Dual Polarity Outputs ADCMP361, 2007, www.analog.com. Norwood, MA, USA.

(Continued)

*Primary Examiner* — Jennifer Mehmood
*Assistant Examiner* — John Mortell
(74) *Attorney, Agent, or Firm* — Mark Nowotarski

(57) ABSTRACT

A water sensing electrode circuit comprises a voltage source; first electrode; second electrode; first resistor; second resistor; and an inverting comparator with an internal reference voltage, $V_c$; wherein: said voltage source, first electrode, second electrode, first resistor and second resistor are connected in series; and the negative input of said voltage comparator is attached to the junction of said first and second resistor.

2 Claims, 6 Drawing Sheets

(56) References Cited

U.S. PATENT DOCUMENTS

| | | | |
|---|---|---|---|
| 4,837,499 A | | 6/1989 | Scherer, III |
| 4,885,571 A | * | 12/1989 | Pauley et al. ............... 340/573.4 |
| 4,918,433 A | * | 4/1990 | Moore ....................... 340/573.1 |
| 5,103,368 A | | 4/1992 | Hart |
| 5,298,884 A | * | 3/1994 | Gilmore et al. ............ 340/573.4 |
| 5,408,222 A | * | 4/1995 | Yaffe et al. ..................... 340/604 |
| 5,486,814 A | * | 1/1996 | Quinones ................... 340/573.6 |
| 5,900,817 A | * | 5/1999 | Olmassakian ............. 340/573.1 |
| 5,983,129 A | * | 11/1999 | Cowan et al. ................. 600/544 |
| 6,157,303 A | | 12/2000 | Bodie et al. |
| 6,603,319 B1 | | 8/2003 | Kasahara et al. |
| 7,642,921 B2 | * | 1/2010 | Cutler et al. ............... 340/573.6 |
| 8,354,924 B1 | * | 1/2013 | Goodwin ................. 340/539.11 |
| 2001/0000851 A1 | | 5/2001 | Morimoto |
| 2007/0069516 A1 | * | 3/2007 | Skokos et al. ................... 283/75 |
| 2007/0132578 A1 | * | 6/2007 | Powell ..................... 340/539.26 |
| 2008/0150733 A1 | * | 6/2008 | Snyder et al. ............. 340/573.6 |
| 2009/0027211 A1 | * | 1/2009 | Cutler et al. ............... 340/573.6 |
| 2009/0295566 A1 | * | 12/2009 | Weintraub ............... 340/539.11 |
| 2010/0026501 A1 | * | 2/2010 | Cutler et al. ............... 340/573.6 |
| 2010/0249557 A1 | * | 9/2010 | Besko et al. ................. 600/340 |
| 2012/0245714 A1 | * | 9/2012 | Mueller et al. .................. 700/91 |

FOREIGN PATENT DOCUMENTS

| | | |
|---|---|---|
| JP | 05-234156 | 9/1993 |
| JP | 2001-184574 A | 7/2001 |
| JP | 2001-331879 A | 11/2001 |
| JP | 2004-145574 A | 5/2004 |
| JP | 2004-303255 A | 10/2004 |
| JP | 2007-26331 A | 2/2007 |
| JP | 2007-047502 | 2/2007 |
| WO | WO 2012/178162 A2 | 12/2012 |
| WO | WO 2012/178162 A3 | 12/2012 |

OTHER PUBLICATIONS

Mill-Max Mfg. Corp., Maximum Connections, 3149—Brass Alloy Solder Mount PCB Pin—Mill-Max Mfg. Corp., Feb. 3, 2011; http://www.mill-Max.com/pin_rec_catalog/productinfo.cfm?webpartnumber=3149&start=1&leaddiameterr., Oyster Bay, NY USA.

Noboru et al., Patent Abstracts of Japan, Publication No. 62-252219, http://www19.ipdl.inpit.go.jp/PA1/cgi-bin/PA1DETAIL, Apr. 11, 1987.

Minoru, Patent Abstracts of Japan, Publication No. 2004-303255A, Oct. 28, 2004

Noboru, Patent Abstracts of Japan, Publication No. 2004-145574, May 20, 2004.

Analog Devices, Inc., Single 0.275% Comparator and Reference with Dual Polarity Outputs ADCMP361, 2007, www.analog.com., Norwood, MA, USA.

Mill-Max Mfg. Corp., Maximum Connections, 3149—Brass Alloy Solder Mount PCB Pin—Mill-Max Mfg. Corp., Feb. 3, 2011; http://www.mill-Max.com/pin_rec_catalog/productinfo.cfm?webpartnumber=3149&start=1&leaddiameterr., Oyster Bay, NY, USA.

W.T. Edmonston, Promoting the Science of Ecology, Measurements of Conductivity of Lake Water Situ, Jan. 1956, pp. 201-204, Published by: Ecological Society of America, http://www.jstor.org/stable/1929687.

Noboru et al., Patent Abstracts of Japan, Publication No. 62-252219, http://www19.ipdl.inpit.go.jp/PA1/cgi-bin/PA1DETAIL, Apr. 11, 1987.

Minoru, Patent Abstracts of Japan, Publication No. 2004-303255A, Oct. 28, 2004.

Noboru et al., Patent Abstracts of Japan, Publication No. 2004-145574, May 20, 2004.

Katsutoshi et al., Patent Abstracts of Japan, Publication No. 2007-26331A, Feb. 1, 2007, http://www19.ipdl.inpit.go.jp/PA1/cgi-bin/PA1DETAIL.

Manabu, Patent Abstracts of Japan, Publication No. 62-75280, Apr. 7, 1987, http://www19.ipdl.inpit.go.jp/PA1/cgi-bin/PA1DETAIL.

Masaki et al., Patent Abstracts of Japan, Publication No. 2007-047502, Feb. 22, 2007, http://www19.ipdl.inpit.go.jp/PA1/cgi-bin/PA1DETAIL.

Kiyoshi et al., Patent Abstracts of Japan, Publication No. 05-234156, Sep. 10, 1993, http://www19.ipdl.inpit.go.jp/PA1/cgi-bin/PA1DETAIL.

International Searching Authority, Search and Opinion of International Application No. PCT/US2012/043999, Jun. 25, 2012.

Japanese Examination Report, Mar. 27, 2012.

* cited by examiner

Electrode Shroud for Water Immersion Detection
Top perspective view
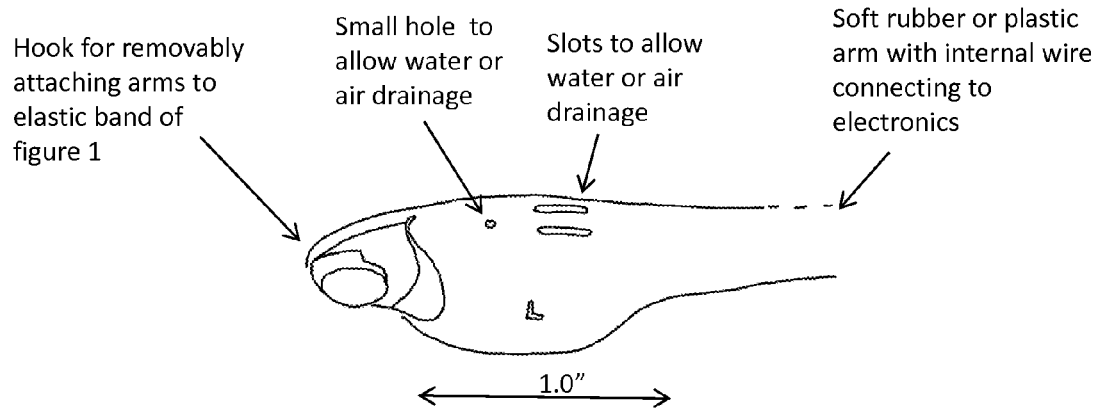
Fig. 2A
Bottom view
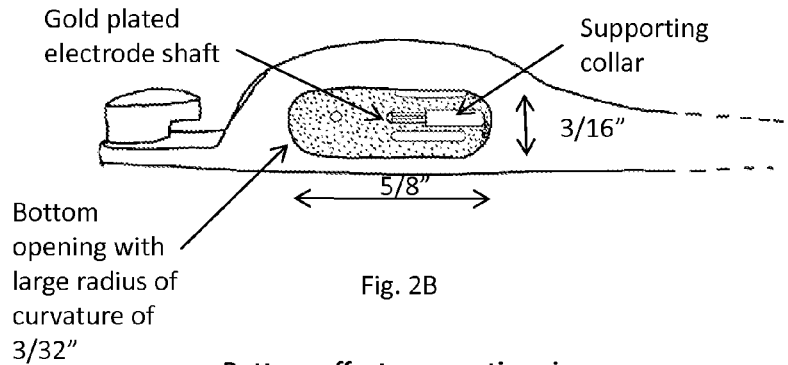
Fig. 2B
Bottom offset perspective view
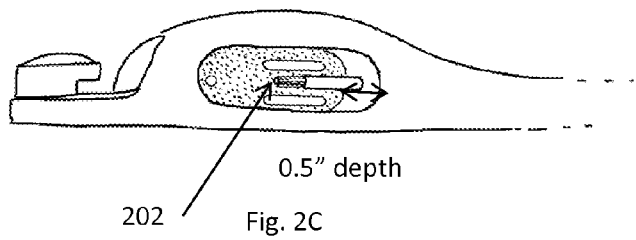
Fig. 2C
FIGURE 2

WATER SENSING ELECTRODE CIRCUIT

CROSS REFERENCE TO RELATED APPLICATIONS

This application claims the benefit of U.S. provisional patent application "Water Sensing Electrode Circuit", Ser. No. 61/500,742, filed Jun. 24, 2011. Said provisional patent application is incorporated herein by reference.

This application is further a continuation-in-part of copending U.S. nonprovisional patent application "Reliable Sensing of Nose and Mouth Immersion", Ser. No. 13/040,330, filed Mar. 4, 2011 now abandoned. Said application is incorporated herein by reference.

Said application Ser. No. 13/040,330 is a divisional of U.S. nonprovisional patent application "Electronic Swimmer Monitoring System", Ser. No. 12/570,233, filed on Sep. 30, 2009 now abandoned. Said nonprovisional patent application is incorporated herein by reference.

Said application Ser. No. 12/570,233 is a divisional of U.S. nonprovisional patent application entitled "Electronic Swimmer Monitoring System", Ser. No. 12/175,797, filed on Jul. 18, 2008 now U.S. Pat. No. 7,642,921. Said nonprovisional patent application is incorporated herein by reference.

Said application Ser. No. 12/175,797 claims the benefit of U.S. provisional patent application entitled "Swimmer Safety Tags", Ser. No. 60/951,243 filed on Jul. 23, 2007. Said provisional application is incorporated herein by reference.

FIELD OF THE INVENTION

The present invention is in the field of swimmer safety.

COPYRIGHT NOTICE

A portion of the disclosure of this patent document contains material to which a claim for copyright is made. The copyright owner has no objection to the facsimile reproduction by anyone of the patent document or the patent disclosure as it appears in the Patent and Trademark Office patent file or records, but reserves all other copyright rights whatsoever.

BACKGROUND OF THE INVENTION

Summary of the Invention

The Summary of the Invention is provided as a guide to understanding the invention. It does not necessarily describe the most generic embodiment of the invention or all species of the invention disclosed herein.

An embodiment of the present invention is a shroud for an electrode for water immersion detection and an associated water sensing electrode circuit. The shroud comprises an interior cavity with an electrode and a cover to prevent wet hair from touching said electrode. The shroud further comprises openings to allow water and air to drain quickly from said cavity. The shroud has the surprising ability to allow rapid and reliable detection of both immersion into water and emersion from water when it is worn on a person's head and in the presence of long wet hair. The water sensing electrode circuit comprises two electrodes in series with a resistor and an inverting comparator with an internal reference voltage to detect water immersion and removal. The water sensing electrode circuit is suitable for all configurations, not just those described herein. The combination of the electrode configuration and water sensing electrode circuit has the surprising benefit of being operable in waters with different conductivities while as the same time having a very low current draw.

BRIEF DESCRIPTION OF FIGURES

FIGS. 2A, 2B and 2C illustrate an electrode shroud for water immersion detection.

DETAILED DESCRIPTION OF THE INVENTION

The following detailed description discloses various embodiments and features of the invention. These embodiments and features are meant to be exemplary and not limiting.

As used herein, the term "about" means within +/−20% of a given value unless specifically indicated otherwise.

In US patent application publication US 2009/0027211 A1, entitled *Electronic Swimmer Monitoring System*, a system and method are described to monitor people electronically to reduce the risk of drowning by identifying when their nose and mouth are underwater for periods of time, which may indicate a dangerous submersion situation, and for triggering corresponding alerts and alarms. Said patent application publication is incorporated herein by reference.

In said method, each monitored person is equipped with an electronic Tag worn on the body that communicates with monitors that, in turn, cause a base station to issue alerts or alarms, including audible and visible distress signals, as well as electronic communications to receivers used by supervisory personnel, such as lifeguards or parents.

Said systems and methods can be modified in a number of ways to achieve surprising benefits.

Shrouding the Electrodes

Figure 1:
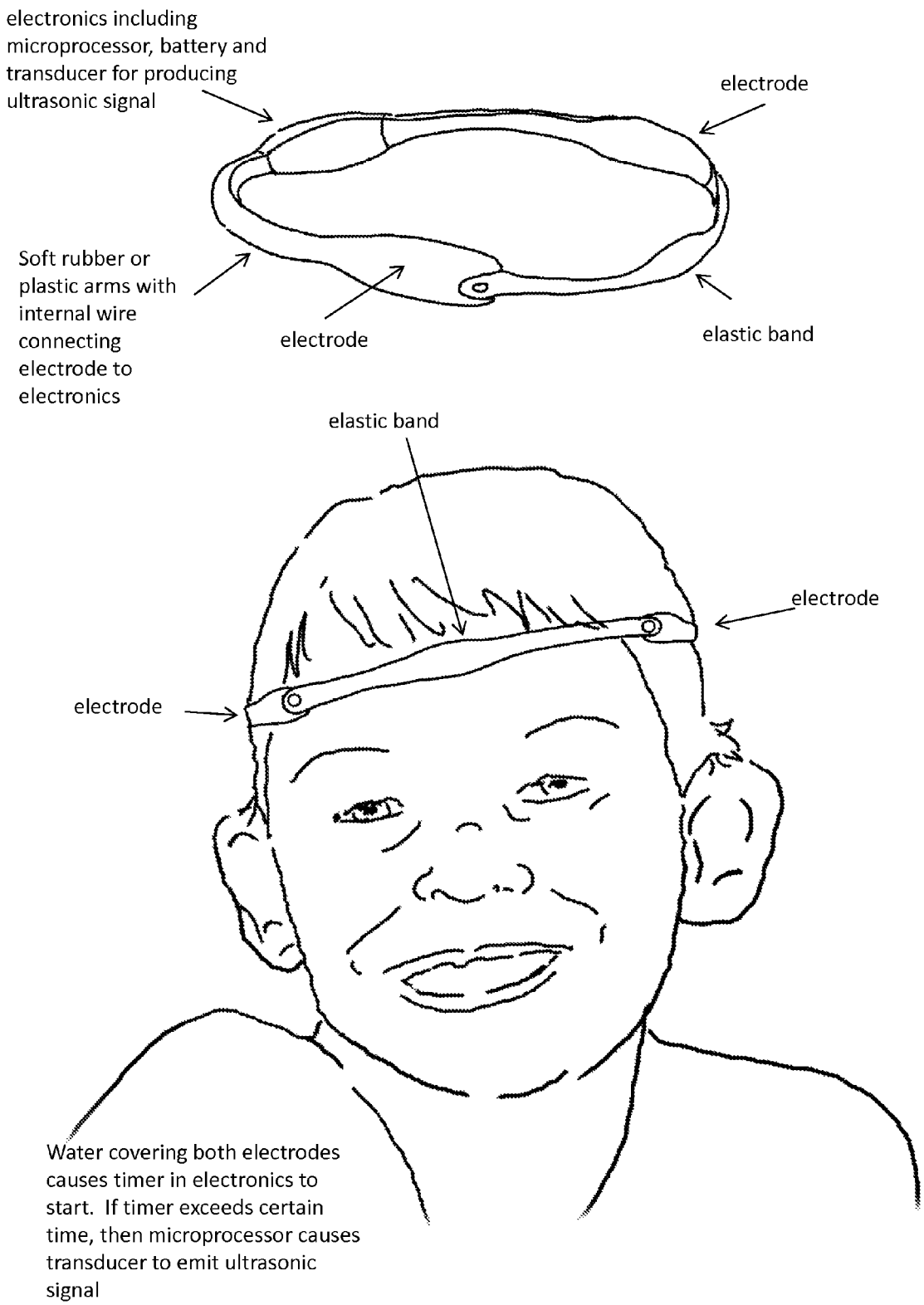
FIG. 1 is an illustration of a headband which detects when a person's nose and mouth are submersed in water.

FIG. 1 presents an illustration of an embodiment of the Tag in a version worn on the head. This embodiment of the design calls for an exposed electrode on each side of the head. When both electrodes are submerged, the conductivity of the water closes the circuit of the Tag, presenting a resistance falling within a range the circuit has been calibrated to recognize as water, commencing a timing sequence in the microprocessor it contains. When either electrode exits the water, such as by a turn of the swimmer's head, the timer in the microprocessor is automatically reset. In an alternative embodiment of the Tag, these electrodes are exposed bare metal, such a rivets or pins. It was discovered in field testing, however, that the exposed electrode design was prone to cause false alarms when used by persons with long hair and swimming in relatively high conductivity water. The long hair would cover the electrodes when a person removed his or her head from water. This caused the timing sequence to continue as if both electrodes were still fully immersed. As a result, the timing sequence would not reliably reset. The effect was absent in lake waters with relatively low conductivity but present in pool waters with relatively high conductivities.

Accordingly, the inventors designed a shroud to enclose each electrode to prevent wet hair from touching it. This prevented false alarms in any type of water such as fresh lake water, chlorinated pool water or salt ocean water.

FIGS. 2A, 2B and 2C present illustrations of different views of a Tag with an embodiment of the shroud. Three rotated views of the shroud are presented. This design has the surprising benefit of not trapping pockets of air or water, either of which would prevent accurate timing of the immersion. If an air pocket is trapped in the shroud when it was immersed in water, then the timer would not start. If a water pocket was trapped in the shroud when it was removed from water, the timer would not stop. Field testing revealed that efficient evacuation of the interior of the shroud of air and water could be reliably and reproducibly attained if the shroud were open on the bottom and porous on the top. A slotted top was found to be less prone to trap air or water than a top with small holes. Small holes, however, were substantially better than no holes at all.

In FIGS. 2B and 2C, the exposed end of each electrode is a conductive metal shaft, plated with gold to prevent corrosion. Testing revealed that to accurately initiate and stop the timing sequence, and reduce the risk of trapped pockets of water or air inside the shroud, the shaft should not touch the interior walls of the shroud. Accordingly, the shroud was configured to include a supporting collar as shown in FIG. 2B, assuring that the exposed end of the electrode will be suspended within the cavity of the shroud. Doing so reduces the risk of water bridging from the interior walls of the shroud to the exposed electrode potentially causing a false detection of submersion. The benefit is that only a completely submerged electrode will detect submersion vs. a film of water bridging from wet hair or skin to the interior surface of the shroud.

Field testing also revealed that efficient drainage of the interior of the shroud was enhanced by using a shroud material, such as silicone rubber, with a smooth, shiny surface.

Testing also revealed that drainage was enhanced by designing the interior of the shroud with curved interior corners with relatively large radii of curvature.

A Tag That Senses Being Worn

It is a feature of the system that the timing sequence is initiated upon immersion of the Tag in water and the sequence continues until the Tag is removed from water or an alarm signal is issued. Once an alarm has begun, it will continue until the Tag is reset by removing it from the water. Consequently, if a Tag is removed from a swimmer and dropped to the bottom of a body of monitored water, it will issue an alarm signal and continue to do so until removed from the water. If a Tag were to be lost in a large body of water, such as a pond, from which a loose Tag might be difficult to locate and remove, such a continuing false alarm could be problematic.

Figure 3:
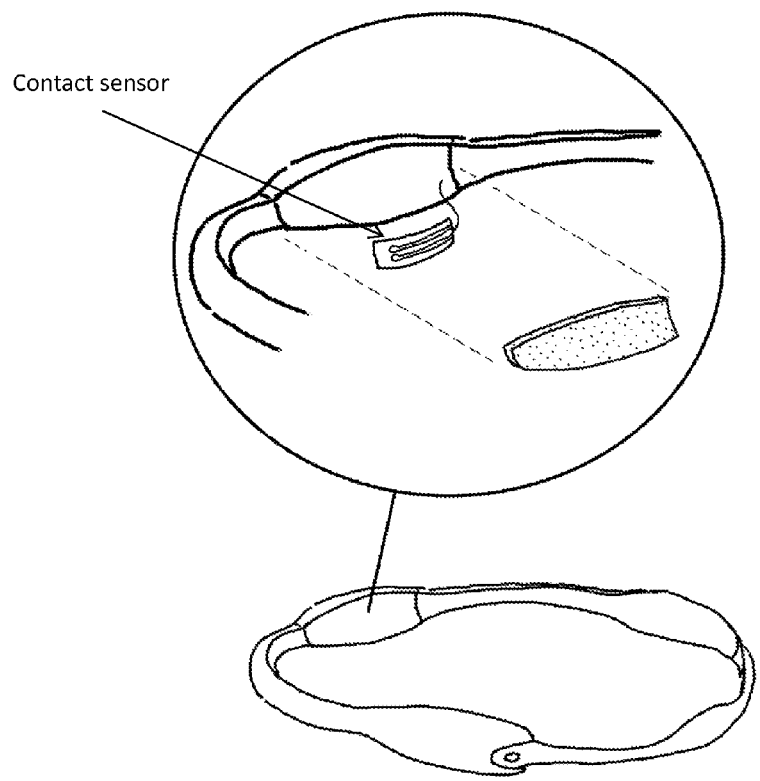
FIG. 3 illustrates a contact sensor for determining when a head band falls off of a swimmer.
Figure 3:
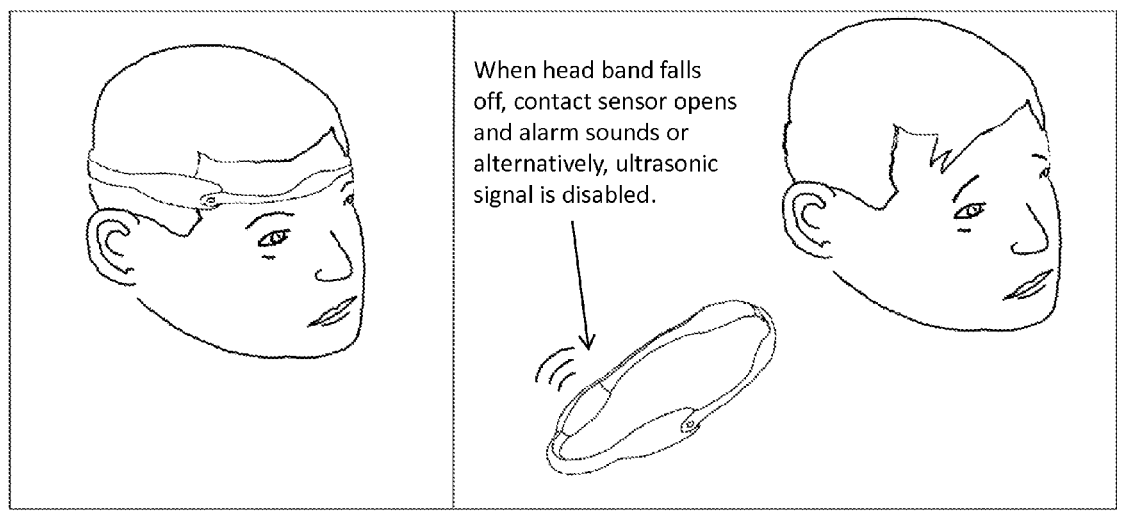

Accordingly, the inventors determined a range of means were available to prevent an alarm signal from being transmitted by an immersed Tag that is not actually worn on the body. One such means is to equip the Tag with a sensor of pressure, or force. The Tag can be designed in such a way that the requisite force is applied to it only when worn in contact with a swimmer's head. If the Tag is removed from the head, the force is not applied to the sensor and the timing sequence can be automatically interrupted by its absence. Alternatively, the same result can be achieved with a photoelectric cell on the inside of the Tag that measures variations in brightness. Or a sensor could be designed that is tuned to be sensitive to skin conductivity, but not that of water. FIG. 3 presents an embodiment of the Tag that deploys such a sensor of pressure or force created between the sensor and the head of the person wearing it.

Location Sensing

The system can be configured not only to sense immersion of the Tag for a potentially hazardous duration, but also to sense the location of a monitored person relative to fixed reference points. For example, by installing into the circuitry of the Tag a radio transmitter that transmits through water, and installing receivers of its airborne signals in fixed receivers or readers around the perimeter of the monitored environment, such as in the Surface Monitor Units (described in said patent publication US 2009/0027211 A1) or to a wider periphery, such as at a surrounding fence or enclosed pool deck, real time location monitoring can be provided. Location can be pinpointed by triangulation of the signals or estimated by comparing the signal strength as measured at the several receivers. If equipped with a means of transmitting an identifying signal unique to each Tag, such as that generated by a Radio Frequency Identification ("RFID") device or a unique serial number, the identity of the individual that has entered the water or exited the facility can also be monitored. It would enable supervisors to know where a patron was, in the pool, in the bathroom, etc. or wherever there were fixed receivers. Such a means can also be used with the blocked-by-water radio transmission timing technique discussed in said patent publication US 2009/0027211 A1 to provide water entry sensing.

Additional Means of Giving Alarm

In said patent publication US 2009/0027211 A1, when a Tag has been immersed long enough, it emits an alarm signal via an ultrasonic signal to the hydrophones arrayed in the water, which in turn, relay the signal to the surface units, which flash a strobe and transmit alarm signals to other devices. In an alternative embodiment, a status LED on the Tag flashes under various circumstances, one of which is that an alert or an alarm signal is being transmitted. With sufficient battery power, the light from the LED can be made rather bright, assisting in detection of the location of the swimmer in certain locations, such as fresh water, often called "dark water". Fresh water or other natural bodies of water such as ocean or bay water, are referred to as "dark water" because they often have suspended particles which reduce the depth that a lifeguard can see submerged objects relative to filtered pool water. The Tag can also be configured to emit an audible tone to assist in locating a swimmer in dark water.

In larger bodies of fresh water, it may be desirable to use means of visually identifying a Tag in alarm mode. For example, a Tag could be configured which releases and inflates a balloon attached to a tether connected to the Tag, which could float on the surface of the water above a submerged swimmer in distress. Alternatively, a Tag could be designed that issues a bright dye cloud, smoke or other dense visible gas just above a submerged swimmer in distress.

For toddlers or the physically disabled, a belt, vest, or swimsuit that automatically inflates in response to an alarm signal from the Tag on the person wearing such garb could be configured.

Adding Unique Identity to Tag

In an alternative embodiment, each Tag is electronically unique, such as through including an RFID, or by having each Tag transmit an electronically distinct signal, whether by transmission of a cadence of beats, variable frequency, variable phase, alphanumeric characters, or a combination of such techniques.

Unique signals from each Tag permit individual tracking of each Tag to monitor swimmer performance, health status, heartbeat, respiration, blood gases, or other metrics of bodily stress or well-being. It also permits knowing specifically which individual in a group is wearing a Tag that is in alarm mode. Tracking such a Tag over time, and logging the results of that tracking, permits the creation of a unique user profile for a variety of uses. Coaches or other supervisors could know specifically which youngster is giving false alarms. It also permits individual tracking of where a given individual is within a monitored facility or outside it. Location can be calculated by various means, including triangulation of signals from a Tag to multiple receivers or differential measurement of signal strength among the receivers.

Such capability can be configured with means of transmission of the signal through air so that the Tag can be used to control entrance and exit through monitored gateways on land or in the water.

Such a capability also permits the conduct of transactions using the identity feature of the Tag. In hotels or water parks, for example, such Tags could be used for commercial transactions, such as entrance to rides or other attractions, purchasing of food, drink or concessions, all without the need for separate currency, room keys or independent proof of age.

Use of System Log

A basic feature of the system is that it logs all monitored events such as alerts and alarms. Such a log can be used to learn important information about a given swimming environment. If the rate of alarms increases at a particular time of day, for example, it may indicate important information about the facility, such as that particular populations of individuals require greater supervision, or particular lifeguards are less effective than others.

When the Tag is equipped to transmit a unique identifier, either constantly, only when in alert or alarm mode, at some predetermined interval, or in response to a query from the control panel, the log could also be used to track individual performance, showing the number of alarms and alerts caused by any given swimmer in a given visit, week or season. The same capability could be used to enhance training. Individual performance, such as time swum underwater without breathing, could be logged. Or a coach could automatically log the amount of time all swimmers on a team spend actually swimming, since the overall time each swimmer swims could be inferred from the times that the Tag registers the beginning and end of a period of continuous swimming. It is common in supervised ponds, or other bodies of dark water, for lifeguards to order all swimmers out of the water at relatively short intervals to count them to assure that all are accounted for. Logging the amount of time of a swimming session could be used to automatically trigger a pond evacuation signal, freeing the lifeguards to watch the water instead of their timers.

Such a logging capability can also be used to generate data useful for a variety of other purposes. The length of time individuals or populations remain safely submerged may be useful to calibrate the lengths of submersion time necessary to trigger Alerts or Alarms for swimmers of different ages, skill levels or demographics. It may also be used to generate other statistics useful for swimmer management and system performance optimization.

Adjustable Timing Interval Tag

In an exemplary embodiment, a time interval of 20 seconds immersion is sensed before a Tag signals a yellow alert, and an additional 10 seconds more, for a cumulative period of 30 seconds, for a red alarm. In an alternative embodiment, a tag could be readily configured to be adjustable by a lifeguard or other responsible adult, such as a parent with suitable documentation, to permit variance of such intervals on a per Tag basis. This would permit use of Tags on individuals training themselves to swim underwater for longer periods than most people. This capability could readily be provided in a child-proof means, such as by a password.

MP3

In an alternative embodiment, Tag and MP3 circuitry could be combined in a single unit so that wearers could listen to music while being monitored for safety. One embodiment of such a product would have Tag and MP3 player circuitry behind the head that is connected to pieces extending around each side of the head that are equipped both with ear buds and shrouded electrodes for immersion detection. Of course, in the future, other formats for sound recording than only MP3 will become popular, and other means of storing and accessing it will also be developed, which can be substituted for a present day MP3 player.

Water Sensing Electrode Circuit

Reliable indication of submersion is crucial to the functioning of the System. Experiments have revealed that variations in the conductivity of the water in which the system is used impacts the choice of circuit parameters that will permit reliable sensing of immersion while maintaining extended battery life. Careful circuit design according to the teaching of this disclosure can result in reliable immersion sensing performance in a broad spectrum of water chemistries, as well as judicious preservation of battery longevity.

Figure 4:
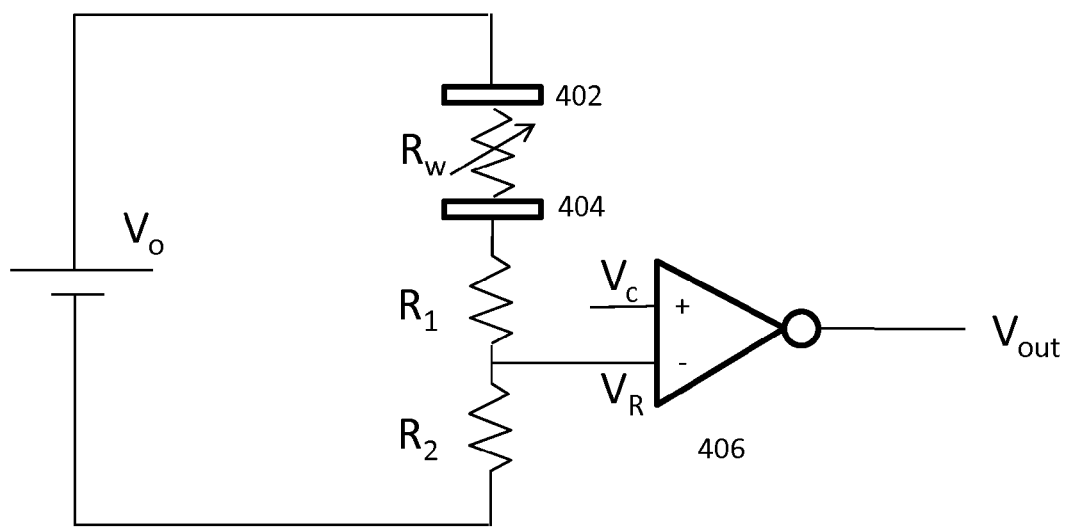
FIG. 4 is a diagram of a water sensing electrode circuit.

FIG. 4 is a circuit diagram of a water sensing electrode circuit. The circuit comprises a voltage source, $V_o$, a first electrode 402, a second electrode 404, a first resistor $R_1$, a second resistor $R_2$, and an inverting comparator 406 with an internally generated reference voltage $V_c$. The voltage source, first and second electrodes, and first and second resistors are connected in series. The negative input to the inverting comparator is connected to the junction of $R_1$ and $R_2$. The electrodes correspond to the electrodes on a swim Tag, such as item 202 illustrated in FIG. 2C. The resistance of the gap between the electrodes is modeled as a variable resistor $R_w$. When the electrodes are immersed in water, the resistance is low. When they are removed from water, the resistance is high. Thus when the electrodes are out of the water, $R_w$ is large, the current through $R_w$ is low, the voltage drop across $R_2$ is low and $V_R$ is less than $V_c$. The output of the inverting comparator is low and hence "off". When the electrodes are immersed in water, $R_w$ is low, the current though $R_w$ is high, $V_R$ is more than $V_c$ and the output of the inverting comparator is high and hence "on". The output is fed into a microprocessor which does the timing and other associated control functions to sound an alarm if the electrodes are immersed too long.

Figure 5:
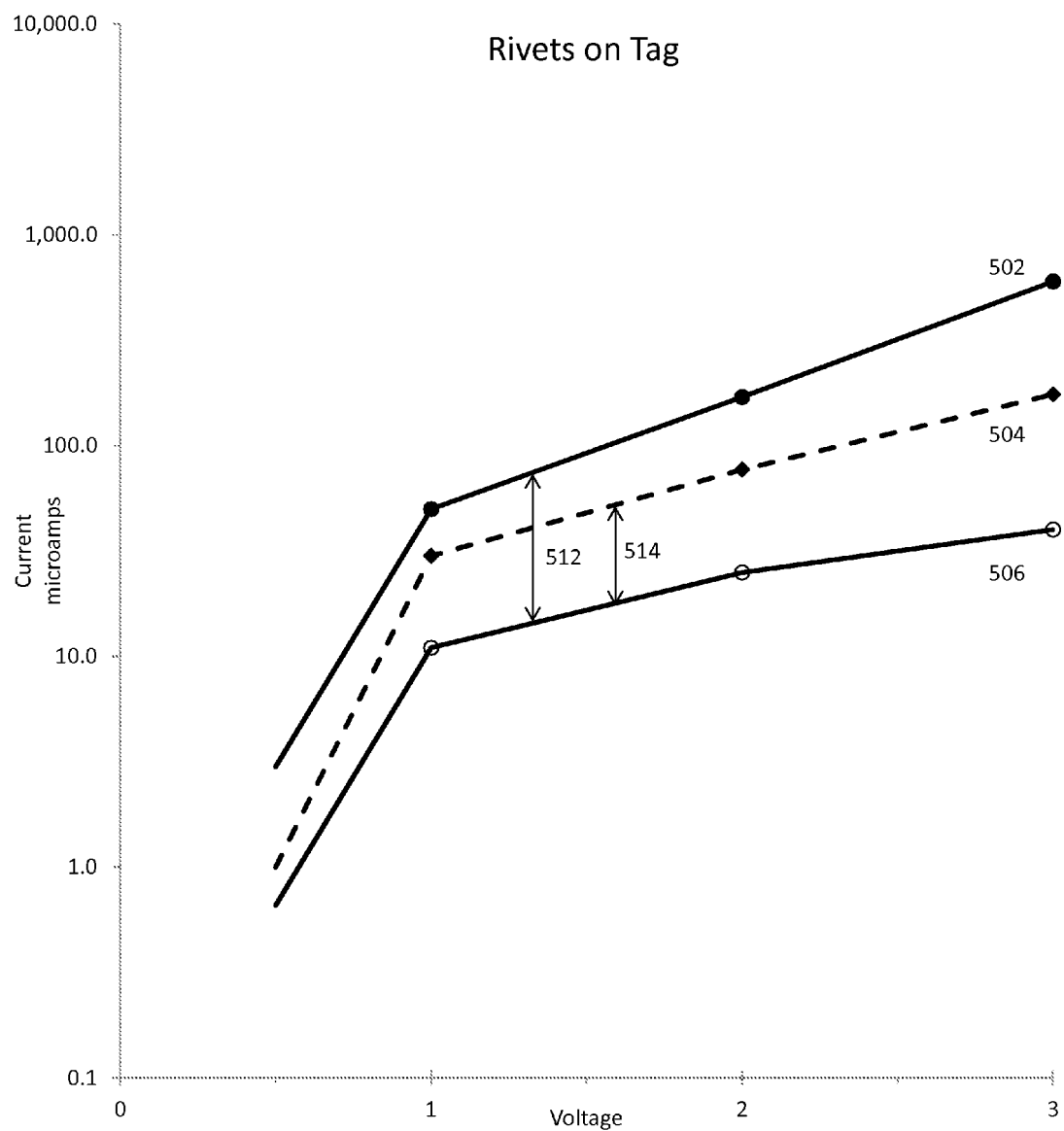
FIG. 5 is a graph of current versus voltage for two rivet electrodes mounted on a tag.

FIG. 5 shows the measured current between two rivet electrodes placed on a circuit board about 1.75 inches apart. Current is shown on a log scale. The current below 1 volt is extrapolated. The electrodes were immersed and removed from water and the current between them was measured. The top curve 502 shows the current measured when the electrodes were immersed in public pool water where the research was conducted. The lower curve 506 shows the current after said electrodes were removed from said pool water. The ratio of current levels 512 between circuit board immersed in water and circuit board removed from water but still wet, was about 15× at 3 volts. The ratio decreased to 4.5× at 1 volt.

Optimally, one would like to operate with a minimum voltage between the electrodes to obtain a minimum current drain, and hence longer battery life. This can be achieved by selecting relatively large values of $R_1$ and $R_2$. The ratio of $R_1$ to $R_2$ can then be selected to correspond to the reference voltage, $V_c$, built into the inverting comparator. At large values of $R_1$ and $R_2$, however, the ratio of current when the electrodes are in the water and current when the electrodes are removed from the water is small and hence the operation of the circuit may become less reliable.

The middle curve 504 in FIG. 5 shows the current when the electrodes on the circuit board were immersed in tap water local to the area where the research took place. The tap water showed a significantly lower electrical conductivity than the pool water in the same area. This is regarded as likely due to a lower ionic content of the tap water relative to the chemically treated pool water. Pool water typically presents a relatively high ionic content due to the presence of added pool chemicals, such as chlorine or bromine compounds. If the circuit is to be used in multiple environments with varying water chemistries, the operating voltage must be higher and the currents must be higher. This can be achieved by lowering the values of $R_1$ and $R_2$, but at the expense of lower battery life.

Different versions of the circuit could be provided for swim tags designed for use in different waters. A swim tag to be used in salt water, for example, might have different values of $R_1$ and $R_2$ than a swim tag to be used in fresh water. Great care would have to be taken, however, to make sure that the appropriate version was used for the water that was swum in.

Figure 6:
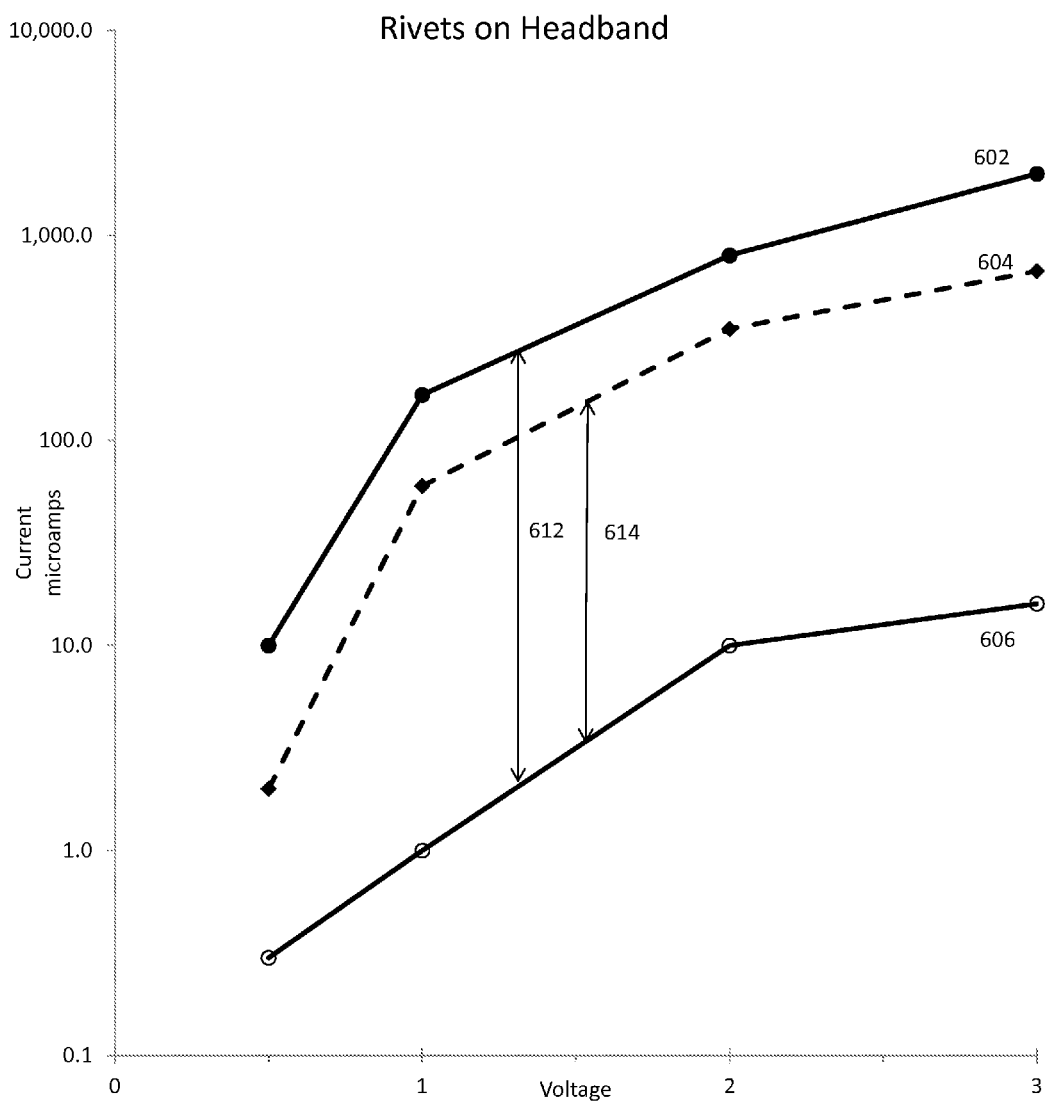
FIG. 6 is a graph of current versus voltage for two rivet electrodes mounted on the opposite sides of a silicone headband.

FIG. 6 shows current versus voltage for exposed rivets mounted on the opposite sides of a silicone headband. Current is shown on a log scale. Curve 602 is for the headband submersed in pool water. Curve 606 is for the headband removed from pool water, but still wet. The ratio 612 of current in-water to current out-of-water was 125× at 3 volts. The ratio was 33× at 0.5 volts. These ratios are much higher than the ratios observed for rivets mounted 1.75" apart on a circuit board. Correspondingly higher values of $R_1+R_2$ can be used with this headband design, therefore, to operate at lower currents and hence obtain higher battery life.

Curve 604 in FIG. 6 shows the current versus voltage for exposed rivets mounted on the opposite sides of a silicone headband when the electrodes were immersed in tap water where the research was conducted. The ratio 614 of current with the electrodes submerged in tap water to the current with the electrodes removed from pool water was 6.6× at 0.5 volts. This is acceptable. Thus the same circuit in combination with exposed electrodes mounted on the opposite side of a silicone head band will work in both the pool and tap water even at high values of $R_1+R_2$ and low current draw.

EXAMPLE 1

A headband with electrode shrouds according to FIG. 2 was built with a water sensing electrode circuit according to FIG. 4 with the following values of the different parameters:
$V_o$=3.3 volts
$R_1$=50k ohms
$R_2$=50k ohms
$V_c$=0.4 volts The inverting comparator with internal reference voltage was an Analog Devices ADCMP361. The electrodes 402, 404 were MilMax 3149 gold plated pins.

The headband was immersed and removed rapidly by hand in tap water from Danbury Conn., pool water from the Brookfield Conn. YMCA, pond water from Redding Conn. and salt water from the Long Island Sound. In all cases, the headband reliably sensed immersion to the water and removal from the water.

Conclusion

While particular embodiments of the present invention have been illustrated and described, it would be obvious to those skilled in the art that various other changes and modifications can be made without departing from the spirit and scope of the invention. Any of the aspects of the invention found to offer advantages over the state of the art may be used separately or in any suitable combination to achieve some or all of the benefits of the invention disclosed herein. The electrode shrouds, for example, would be effective no matter how they are attached to a person's head.

The invention claimed is:

1. A system for sensing water immersion and removal, said system comprising a water sensing electrode circuit, said water sensing electrode circuit comprising:
 a. a voltage source;
 b. a first electrode;
 c. a second electrode;
 d. a first resistor;
 e. a second resistor; and
 f. an inverting comparator with an internal reference voltage, Vc;
wherein:
 g. said voltage source, first electrode, second electrode, first resistor and second resistor are connected in series; and
 h. the negative input of said voltage comparator is attached to the junction of said first and second resistor; and
wherein
 the system further comprises a head band wherein said first electrode and said second electrode are mounted on said headband such that they reside on the opposite sides of a person's head when said headband is worn by said person.

2. The system of claim 1 wherein said first electrode is covered by a porous shroud.

* * * * *